United States Patent
Garcia et al.

(10) Patent No.: US 9,967,896 B2
(45) Date of Patent: May 8, 2018

(54) METHOD AND COMMUNICATION NODE OF SCHEDULING RADIO RESOURCES

(71) Applicant: Telefonaktiebolaget L M Ericsson (publ), Stockholm (SE)

(72) Inventors: Virgile Garcia, Beijing (CN); Pål Frenger, Linköping (SE); Zhan Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/765,819

(22) PCT Filed: Jul. 22, 2015

(86) PCT No.: PCT/CN2015/084787
§ 371 (c)(1),
(2) Date: Aug. 4, 2015

(87) PCT Pub. No.: WO2017/012091
PCT Pub. Date: Jan. 26, 2017

(65) Prior Publication Data
US 2017/0230989 A1    Aug. 10, 2017

(51) Int. Cl.
*H04W 4/00*    (2009.01)
*H04W 72/12*    (2009.01)
(Continued)

(52) U.S. Cl.
CPC ....... *H04W 72/1205* (2013.01); *H04W 72/02* (2013.01); *H04W 72/04* (2013.01);
(Continued)

(58) Field of Classification Search
None
See application file for complete search history.

(56) References Cited

U.S. PATENT DOCUMENTS 6,847,626 B1 * 1/2005 Carneal ................ H04L 1/1867
370/345
2006/0268908 A1   11/2006 Wang et al.
(Continued)

FOREIGN PATENT DOCUMENTS

WO    2014180276 A1    11/2014

OTHER PUBLICATIONS

International Search Report and the Written Opinion for Application No. PCT/CN2015/084787, dated Apr. 12, 2016, 12 pages.
(Continued)

*Primary Examiner* — Anh-Vu Ly
(74) *Attorney, Agent, or Firm* — Nicholson De Vos Webster & Elliott LLP (57) ABSTRACT

The embodiments disclose a method for scheduling radio resources in a radio communication network. The method comprises obtaining two or more MAC modes to be used for scheduling radio resources; and partitioning the radio resources into multiple resource blocks, each of which associates with one of the two or more MAC modes. Each of the two or more MAC modes is used to schedule associated resource block. Meanwhile, the embodiments also disclose a method for transmitting traffic in the radio communication network. The method comprises selecting a MAC mode from a list of active MAC modes for the traffic. Each MAC mode in the list of active MAC modes associates with respective resource blocks and is used to schedule the associated resource block. The traffic is transmitted over resource scheduled by the selected MAC mode.

12 Claims, 7 Drawing Sheets

(51) Int. Cl.
*H04W 72/04* (2009.01)
*H04W 84/12* (2009.01)
*H04W 72/02* (2009.01)
*H04W 72/08* (2009.01)

(52) U.S. Cl.
CPC ..... *H04W 72/048* (2013.01); *H04W 72/0446* (2013.01); *H04W 72/0453* (2013.01); *H04W 72/08* (2013.01); *H04W 84/12* (2013.01)

(56) References Cited

U.S. PATENT DOCUMENTS

| | | | | |
|---|---|---|---|---|
| 2007/0189205 A1* | 8/2007 | Terry | ............... | H04L 1/1812 |
| | | | | 370/328 |
| 2011/0038343 A1* | 2/2011 | Bhatti | ............... | H04W 28/06 |
| | | | | 370/330 |
| 2011/0151914 A1* | 6/2011 | Leng | ............ | H04W 72/0413 |
| | | | | 455/509 |
| 2011/0222458 A1* | 9/2011 | Wu | ............... | H04W 72/121 |
| | | | | 370/312 |
| 2011/0292895 A1* | 12/2011 | Wager | ............. | H04L 5/0007 |
| | | | | 370/329 |
| 2012/0201219 A1* | 8/2012 | Wager | ............. | H04L 1/1812 |
| | | | | 370/329 |
| 2015/0264718 A1* | 9/2015 | Yu | ............... | H04W 72/02 |
| | | | | 370/329 |
| 2015/0305041 A1* | 10/2015 | Kim | ............... | H04W 72/085 |
| | | | | 370/329 |
| 2016/0234702 A1* | 8/2016 | Heo | ............... | H04W 24/04 |
| | | | | 370/329 |
| 2017/0150424 A1* | 5/2017 | Lee | ............... | H04W 48/12 |
| | | | | 370/329 |

OTHER PUBLICATIONS

International Preliminary Report on Patentability for Application No. PCT/CN2015/084787, dated Nov. 9, 2017, 19 pages.

* cited by examiner

Fig. 5 selecting a MAC mode from a list of active MAC modes for the traffic, wherein each MAC mode in the list of active MAC modes associates with respective resource blocks and is used to schedule the associated resource block, wherein the traffic is transmitted over resource scheduled by the selected MAC mode    310

Fig. 6 selecting a MAC mode from a list of active MAC modes for the traffic, wherein each MAC mode in the list of active MAC modes associates with respective resource blocks and is used to schedule the associated resource block, wherein the traffic is transmitted over resource scheduled by the selected MAC mode    310 transmitting the traffic using a resource scheduled by the selected MAC mode    320

METHOD AND COMMUNICATION NODE OF SCHEDULING RADIO RESOURCES

CROSS-REFERENCE TO RELATED APPLICATIONS

This application is a National stage of International Application No. PCT/CN2015/084787, filed Jul. 22, 2015, which is hereby incorporated by reference.

TECHNICAL FIELD

The present technology relates to the field of communication, particularly to a method in a communication node for scheduling radio resources in a radio communication network, and a method for transmitting traffic by the scheduled radio resources. The technology also relates to a communication node and a computer readable storage medium for performing the method.

BACKGROUND

Currently, mobile communication technologies are evolving to include the deployment of very high frequencies, larger carrier bandwidth, very high data rates and multiple heterogeneous layers. The future mobile networks (i.e. next generation of mobile networks) are likely to be a combination of evolved 3G technologies, 4G technologies and emerging ones with substantially new components millimeter Wave (mmW) based communications, high gain beamforming, etc. Due to the increasing demand to enhance wireless capacity and due to lack of availability of spectrum in lower frequency range (e.g. 800 MHz-3 GHz), it is envisioned that some next generation of mobile network use cases will require much wider bandwidth than what is available for existing mobile systems. Furthermore, the next generation of mobile network is targeting frequencies in a very wide range from below 1 GHz up to 100 GHz for.

Owing to large signal attenuation with respect to path loss when operating over such high frequencies and also the possibly much higher data demanding at certain deployment cases, the network densification (densely deployed radio access nodes (AN)) and possibly high gain beamforming become necessary as strategic leverages to meet aforementioned service demands.

In next generation of mobile network systems, it is envisioned that a wide range of applications, services and topology would be served by a common systems. Topologies such as classical cellular, machine type communications, user to users, relays, unlicensed or license assisted networks, etc. are expected to take place and create a diversity of links (not simply access point (AP) to user equipment (UE)) and tend to have a network with less hierarchy.

The wireless network deployments may also have a much larger diversity. Operator networks would typically be well-planned, i.e. with more or less regular distance and coverage, but non-operator managed ones or indoor solutions may have bad or no planning.

The backhauling capabilities of these deployments may also vary from high capacity direct backhaul to wirelessly relayed access points, which impact the coordination potential and media access control (MAC) behavior.

The use cases and topology links present in a next generation of mobile network system have different requirements in term of traffic and quality of service (QoS) needs (e.g. extreme short latency, large throughput, low power, etc.) that have to be handled by the MAC and physical (PHY) layers.

Some of these use cases also create topologies that are more complex and diverse than classical networks. For instance, new links types can occur from UE to UE, AP to AP (e.g. for self-backhauling purposes), multiple links attachments, machine communications, etc.

All these new usages make a single kind of MAC process, which is used to schedule the radio resources, hard to be designed to fit all requirements and high performances. For example, there are scheduling based MAC process used by Long Term Evolution (LTE) and cellular network and contention based MAC process used by the wireless fidelity (Wi-fi) network and wireless local network (WLAN). However, both of them present advantages and disadvantages.

Scheduling Based MAC

LTE and preceding cellular network techniques use scheduling based MAC, a single MAC process managed by APs. In a cell, the AP performs the selection of which resources will be assigned for both uplink (UL) and downlink (DL). UL requests have to be made through physical random access channel (PRACH) by the users to be granted some resources. Assignments of both DL and UL resources are to be transmitted to users prior to payload transmissions.

Cellular and AP-centric approach introduces some difficulty to manage links that are at not directly AP-UE, in particular due to the necessity to choose between Transmit and Receive mode. For example, considering an AP to AP communication, both APs have to make sure that their time division duplex (TDD) modes are correctly configured so that an AP can transmit while the other can receive. Combining multiple types of links or link hierarchy in one cell becomes unpractical to handle with classic scheduling based MAC process.

Additionally, when a UE requests a transmission, the terminal need to quantize and feedback limited information about the desired transmission (buffer status, QoS, etc.) or about its environment (interference situation, bandwidth usage, other active links, etc.). The transmission request from the UE thus introduces some latency. More important issue is that a limited feedback channel could not timely transmit comprehensive information to the AP side.

Hence, a "whole picture" for optimal scheduling is difficult to be available at AP side. Furthermore, if new link type such as UE-UE becomes reality, it is also burdensome for an AP to get information about the UE's duplex status, i.e. transmission (TX) or reception (RX).

Contention Based MAC

Contention based MAC works in a distributed way, where radio resource assignments are decided for each link pair separately. Various schemes exists, such as the simple Listen before Talk, i.e. the transmitter first senses the radio channel for existing transmission, and if possible, transmits directly it's data, or Request to send/Clear to send (RTS/CTS), i.e. the transmitter first transmits a request and the receiver replies with an acknowledgment so as to avoid the hidden-node problem.

Contention based MAC works well when low coordination between cells is needed and is a low complexity solution to allow a diversity of link types. However, it is well known that contention based MAC is suffering high performance losses when heavy loads are in the system if certain coordination or situational parameter adjustment is not available.

In short, since next generation of mobile network is designed to operate in a wide range of frequency bands (from sub 1 GHz to 100 GHz) and shall support a large number of services with fundamentally different requirements (Critical Machine Type Communications (C-MTC), Tactile internet, Mobile broadband), there is some risks that the overall solution becomes very complex. Taking the union of all requirements is a sure receipt for failure. For every use case, we would be able to design a much more suitable system if we only need to fulfill the requirements that are relevant for that particular use case. If the requirements for every use case are to be fulfilled, then there is a high risk that next generation of mobile network ends up being something like a duck: It can swim, it can run, and it can fly. But a shark, a leopard, and an eagle can all do one of those things much better.

SUMMARY

It's an object of the present disclosure to resolve or alleviate at least one of the problems mentioned above.

A first aspect of the present disclosure relates to a method implemented by a communication node for scheduling radio resources in a radio communication network. The method comprises obtaining two or more MAC modes to be used for scheduling radio resources; and partitioning the radio resources into multiple resource blocks, each of which associates with one of the two or more MAC modes. Each of the two or more MAC modes is used to schedule associated resource block.

A second aspect of the present disclosure relates to a method implemented by a communication node for transmitting traffic in a radio communication network. The method comprises selecting a MAC mode from a list of active MAC modes for the traffic. Each MAC mode in the list of active MAC modes associates with respective resource blocks and is used to schedule the associated resource block. The traffic is transmitted over resource scheduled by the selected MAC mode.

A third aspect of the present disclosure relates to a computer readable storage medium storing instructions which, when run on a communication node, cause the communication node to perform the steps of the method as described above.

A fourth aspect of the present disclosure relates to a communication node configured to schedule radio resources in a radio communication network. The communication node comprises an obtaining unit and a partitioning unit. The obtaining unit is adapted to obtain two or more MAC modes to be used for scheduling radio resources. The partitioning unit is adapted to partition the radio resources into multiple resource blocks, each of which associates with one of the two or more MAC modes. Each of the two or more MAC modes is used to schedule associated resource block.

A fifth aspect of the present disclosure relates to a communication node configured to schedule radio resources in a radio communication network. The communication node comprises a processor and a memory. The memory contains instructions executable by the processor whereby the communication node is operative to obtain two or more MAC modes to be used for scheduling radio resources and partition the radio resources into multiple resource blocks, each of which associates with one of the two or more MAC modes. Each of the two or more MAC modes is used to schedule associated resource block.

A sixth aspect of the present disclosure relates to a communication node configured to transmit traffic in a radio communication network. The communication node comprises a processor and a memory. The memory contains instructions executable by the processor whereby the communication node is operative to select for the traffic a MAC mode from a list of active MAC modes. Each MAC mode in the list of active MAC modes associates with respective resource blocks and is used to schedule the associated resource block. The traffic is transmitted over resource scheduled by the selected MAC mode.

In the embodiments, several independent MAC processes are allowed to coexist. The physical radio resources are split among the different MAC processes to allow MAC multiplexing. The individual MAC processes are able to schedule the radio resource block assigned to them respectively. As such, the node or link is enabled to select the MAC process fitting the best its situation to schedule the radio resources. In this way, the communication nodes in the network can take advantage of the benefits of different MAC processes.

BRIEF DESCRIPTION OF THE DRAWINGS

The technology will be described, by way of example, based on embodiments with reference to the accompanying drawings, wherein.

DETAILED DESCRIPTION

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understood that the embodiments are not limited to those specific terms but may be applied to all similar entities, such as base station, macro base station, femto base stations, Core Network (CN), NodeB, eNB etc.

Embodiments herein will be described below with reference to the drawings.

Figure 1:
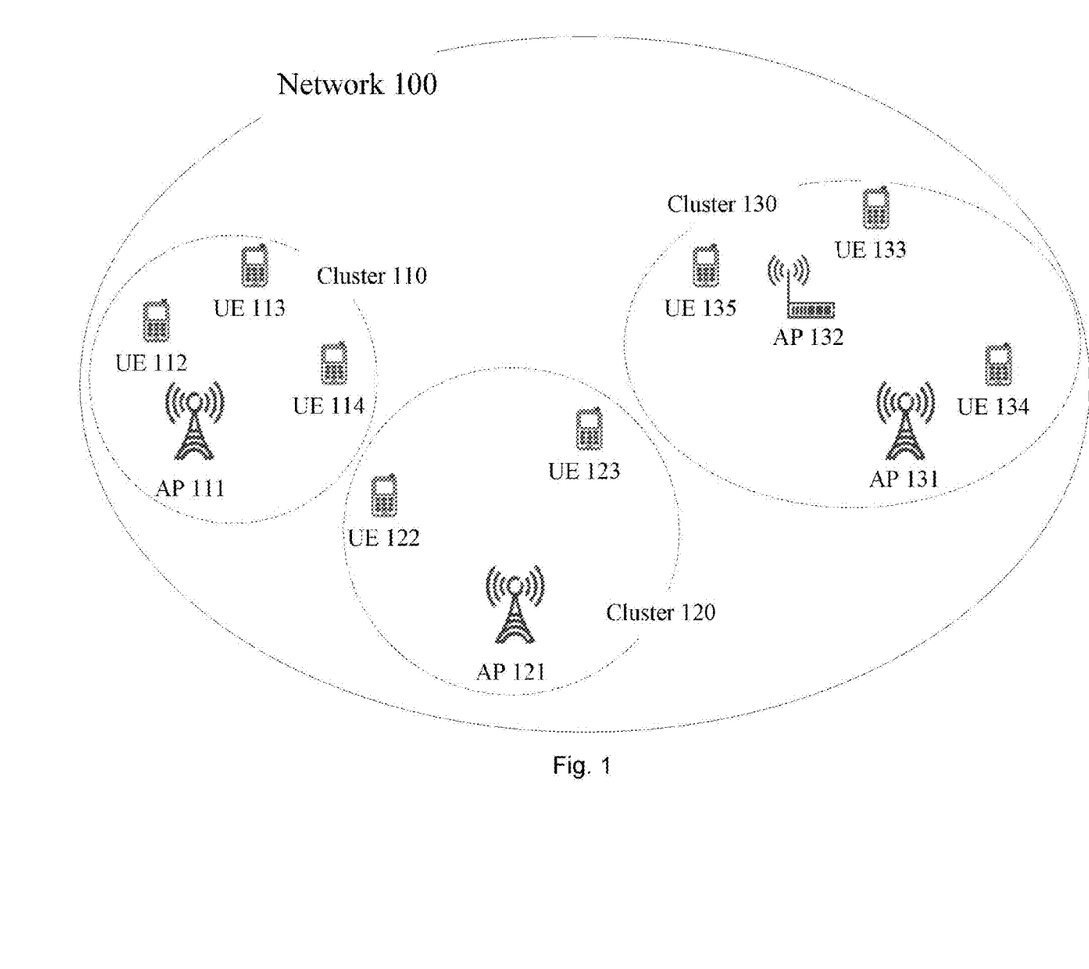
FIG. 1 schematically illustrates an exemplary radio communication network environment that is suitable for implementing the embodiments of the present disclosure.

FIG. 1 schematically illustrates an exemplary radio communication network environment that is suitable for implementing the embodiments of the present disclosure. As shown, the radio communication network 100 includes three clusters of communication nodes, clusters 110-130. The cluster 110 comprises AP 111 and UEs 112-114. The AP 111 serves the UEs 112-114. The cluster 120 comprises AP 121 and UEs 122-123. The AP 121 serves UEs 122-123. The cluster 130 comprises APs 131-132 and UEs 133-135. The APs 131-132 serve the UEs 133-135. The AP 132 can be a relay AP. As such, the AP 132 communicates with the AP 131 for backhauling, for example.

The UE may be any device intended for accessing services via an access network and configured to communicate over the access network. For instance, the UE may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The UE may be a portable, pocket-storable, hand-held, computer-comprised, machine-type communication device, or vehicle-mounted mobile device, enabled to communicate voice and/or data, via a wireless or wireline connection.

Figure 2:
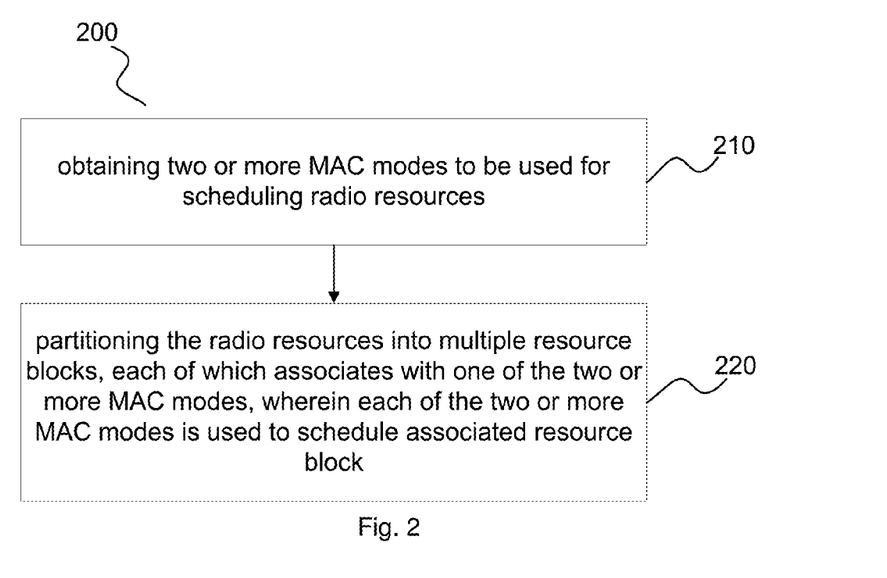
FIG. 2 schematically illustrates a flowchart of a method implemented by a communication node for scheduling radio resources in accordance with an embodiment.

FIG. 2 schematically illustrates a flowchart of a method 200 implemented by a communication node for scheduling radio resources in accordance with an embodiment. Here, the communication node can be either an AP or a UE as shown in FIG. 1. In this case, the communication node performs the method for itself. Alternatively, the communication node can be a coordinating point. In this case, the communication node (if dedicated, not shown in FIG. 1) will perform the method for a plurality of communication nodes, such as the communication nodes in cluster 110 as shown in FIG. 1. Now the process of the embodiment will be described in detail with reference to the FIG. 2.

In block 210, the communication node obtains two or more MAC modes to be used for scheduling radio resources. Herein, a MAC mode is characterized by a MAC scheme, an algorithm for the MAC scheme and parameters used in the MAC scheme. The MAC scheme defines the way to schedule radio resources, such as scheduling based MAC, contention based MAC. Herein, the scheduling based MAC scheme and contention based MAC scheme are used to describe the embodiments by way of example, and other suitable MAC schemes are also applicable to the present disclosure. The algorithm for the MAC scheme refers to an algorithm used in a MAC scheme. The MAC scheme can use different algorithm as appropriate. For example, the contention based MAC scheme can use the algorithm of RTS/CTS or Listen before Talk. In addition, the parameters used in the MAC scheme include timing, prioritization, resource location, etc. The parameters used can be dependent on the nodes that are using the MAC mode, or by the type of service/traffic using the MAC mode. For example, in the case of a contention based MAC scheme, the presence of a wireless backhauling (AP to AP communication) could get higher prioritization than other links due to its critical requirements. In this case, the MAC scheme and algorithm could be similar to the case that no AP to AP communication presents, but some specific parameters will be set, such as shorter sensing period, shorter back-off period, etc. It should be noted that different MAC modes can use the same MAC scheme but different algorithm and/or parameters. In other words, the same MAC scheme employing different algorithm or parameter consist different MAC modes.

If the communication node, e.g. AP 131 or UE 134, performs the method for itself, the communication node will obtain several MAC modes available to the communication node. If the communication node is a cluster coordinating point that performs the method for the communication nodes, for example, in the cluster 130, the communication node will communicate with the APs 131-132 and the UEs 133-135 to obtain the MAC modes available to them. For example, the communication nodes can exchange the information with the APs 131-132 through backhauling.

In block 220, the communication node partitions the radio resources into multiple resource blocks, each of which associates with one of the two or more MAC modes. Each of the two or more MAC modes is used to schedule associated resource block. Specifically, each of the MAC modes will be designated to handle a different resource block.

In an embodiment, the communication node is a UE, e.g. UE 133. The UE 133 is using a set of radio resources to communicate with other network nodes. On the one hand, the UE 133 is to transmit data stream to the AP 132 over a first subset of the radio resources. On the other hand, the UE 133 is to transmit data stream to another UE 134 over a second subset of the radio resources. As such, the UE partitions the first subset of radio resources to the scheduling based MAC mode, and the second subset of radio resources to the content based MAC mode.

In another embodiment, the communication node is an AP, e.g. AP 131. The AP 131 serves UEs 133-135. One of them, for example the UE 133 is known to have critical traffic, since the UE 133 is a sensor device with alarm. In this case, the AP 131 can split the resources into two parts, one for critical traffic and the other for regular traffic. Both can use a scheduling based MAC scheme but with different parameters such as timing, prioritization, resource location, etc.

In a further embodiment, the communication node is a cluster coordinating point that performs the method for the communication nodes in the cluster 120. Here, the coordinating point can be hosted by one of the communication nodes in the cluster 120 such as AP 121. Alternatively, the coordinating point can be a dedicated node (not shown) performing the method. As illustrated in FIG. 1, the cluster 120 is adjacent to the clusters 110 and 130 and located between them. The clusters 110 and 130 are using their own MAC mode independently to each other. The cluster 110 is using the MAC mode#1 and the cluster 130 is using the MAC mode#2. As such, the cluster 120 will be interfered by both the cluster 110 and the cluster 130. Hence, the coordinating point can make a partition to let nodes within cluster 120 use the same MAC mode as their neighbor cluster. For example, The UE 122 close to the cluster 110 will use the MAC mode#1, and the UE 123 close to the cluster 130 will use the MAC mode#2. Accordingly, the radio resource used by UE 122 will be partitioned to associate with the MAC mode#1, and the radio resource used by the UE 123 will be partitioned to associate with the MAC mode#2.

As can be seen, the partition can be performed in either centralized or distributed way. In the centralized way, the communication node is a coordinating point. In the distributed way, the communication node is a UE or an AP.

It should be appreciated that the above partitioning radio resources for multiple MAC modes is described by way of example, and other suitable ways of partitioning radio resources for multiple MAC modes can be applied to the present disclosure.

Please note that the partitioning of the radio resources can performed within different ranges of the radio communication network. For example, the partitioning can be directed to a single communication node such as the AP 111 or the UE 112, a cluster of nodes (or a cell) such as the cluster 110, or even the whole network such as the network 100. If a partitioning is performed for a cell, all the nodes in the cell will follow the result of the partitioning. However, if a communication node within the cell also performs a partitioning for itself, the partitioning result directed to the communication node will override the partitioning result directed to the cell.

Instead of using a single MAC mode to schedule radio resources for the radio communication network, several independent MAC modes are allowed to coexist. The physical radio resources are split among the different MAC modes to allow MAC multiplexing. The individual MAC modes are able to schedule the radio resource block assigned to them respectively. As such, the node or link is enabled to select the MAC mode fitting the best its situation to schedule the radio resources. In this way, the communication nodes in the network can take advantage of the benefits of different MAC modes.

The partitioning of the radio resources can be made using any multiplexing technique such as time division, frequency division, code division, space division, and the like.

Figure 3:
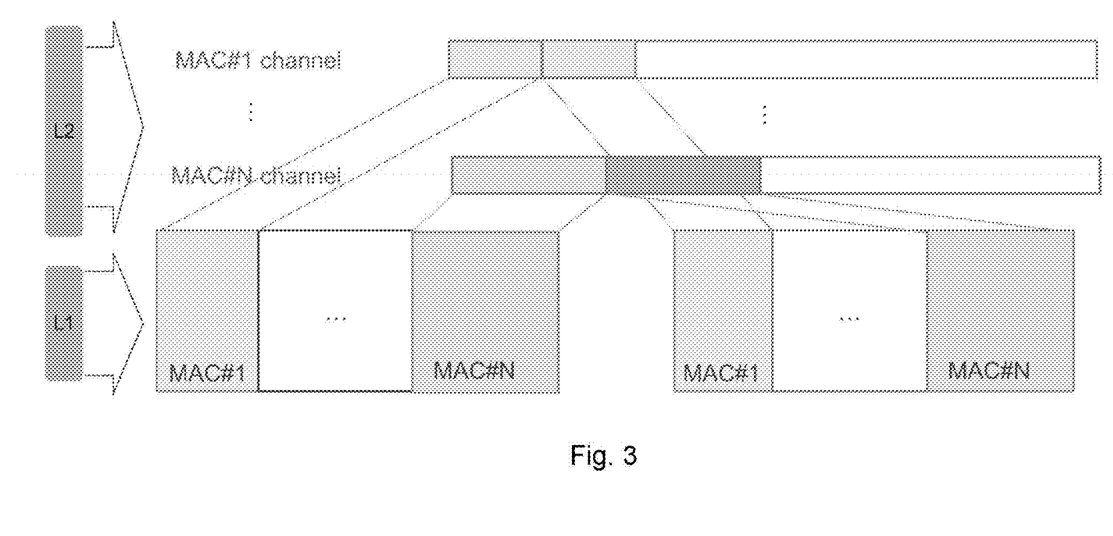
FIG. 3 schematically illustrates the time-division multiplexing when the radio resources are partitioned in time for the individual MAC modes.

As illustrated in FIG. 3, the radio resources are partitioned for the individual MAC modes, i.e. MAC mode#1 to MAC mode#N, by means of time division multiplexing. Each of the MAC modes is allocated different time slots to schedule the resource block assigned to the MAC mode. The time division has the advantage of keeping the different MAC modes independent. For example, there is no frequency-selective duplexing or multiplexing issue and inter-cell interference that can alter the protocol or control information.

Additionally, in the case that the radio resources are required to be constantly available in time (i.e. full duplex), frequency division multiplexing can be a good alternative.

Alternatively, the partitioning of the radio resources can be made using space division multiplexing. If the radio resources are partitioned in space, the communication nodes within a physical area utilize a same MAC mode. For example, the spatial radio resources used by the cluster 110 are partitioned to associate with the MAC mode#1, while the spatial radio resources used by the cluster 130 are partitioned to associate with the MAC mode#2. As such, all the communication nodes within the cluster 110 will utilize the MAC mode#1 to schedule radio resources, and all the communication nodes within in the cluster 130 will utilize the MAC mode#2 to schedule radio resources.

The resource blocks associated with different MAC modes can be configured with different physical parameters to accommodate the different MAC modes. For example, for a MAC mode using the scheduling based MAC scheme, the dimension of the resource blocks can be changed depending on the usage requirement, e.g. having different transmission time interval (TTI), having shorter or wider bandwidth for each resource block. For another example, in comparison with the resource block associated with a MAC mode used for the regular traffic, the resource block associated with a MAC mode used for the critical traffic has shorter TTI and can not use hybrid automatic repeat request (HARQ) since it's time consuming.

Generally, all the radio resources will be partitioned into a plurality of resource blocks to associate with individual MAC modes. However, it is also likely that a portion of the radio resources is partitioned as mode-independent resource block which is used to transmit information accessible by all of the MAC modes. For example, the mode-independent resource block can be used to transmit system broadcast information, pilots, etc.

In the present disclosure, the radio resources can be partitioned adaptively. In an embodiment, the partitioning of the radio resources can be triggered periodically. For example, an AP is using two MAC modes, the first MAC mode including a scheduling based scheme (hereinafter called scheduling based MAC mode) and the second MAC mode including a contention based scheme (hereinafter called contention based MAC mode). Each of the MAC modes is assigned half of the radio resources used by the AP. Since the scheduling based MAC mode is more suitable to schedule radio resource for the traffic from the AP to the UEs, the radio resources associated with the scheduling base MAC mode is used for the communication between the AP and the UEs served by the AP, and since the contention based MAC mode is more suitable to schedule radio resource for the traffic from the AP to another AP, the radio resources associated with the contention based MAC mode is used for the communication between the AP and another AP. Now, with the increasing communication between the AP and the UEs and decreasing communication between the AP and another AP, some radio resources used for the communication between the AP and the other AP are expected to be used for the communication between the AP and the UEs. As such, even more radio resources are preferred to be scheduled by the scheduling based MAC mode for the communication between the AP and the UEs. In this case, it's advantageous to periodically perform the partition of the radio resources to adapt to the situation.

In another embodiment, the partitioning of the radio resources can be triggered by events. The events may include any cases that the current partition appears not to satisfy the node, such as new or change in traffic needs, change in MAC parameters, change in available or used MAC modes, etc.

Through adaptively partitioning the radio resources, it can be ensured that the next generation of mobile network is prepared not only for a gradual introduction of new services but also for a gradual deprecation of feature as more efficient solutions are developed. This is achieved by assigning a gradually increasing set of physical radio resources to the MAC mode scheduling resources for the new solution at the expense of the physical radio resources assigned for the MAC mode scheduling for the deprecated solution.

In an embodiment, in order that the MAC modes are able to work in full independence with each other, control signalings used in a MAC mode are transmitted over the resource block associated with the MAC mode. The control signalings comprise, but not limited to, reference signals, synchronization signals, system broadcasts and the control messages specific to the MAC mode.

Figure 4:
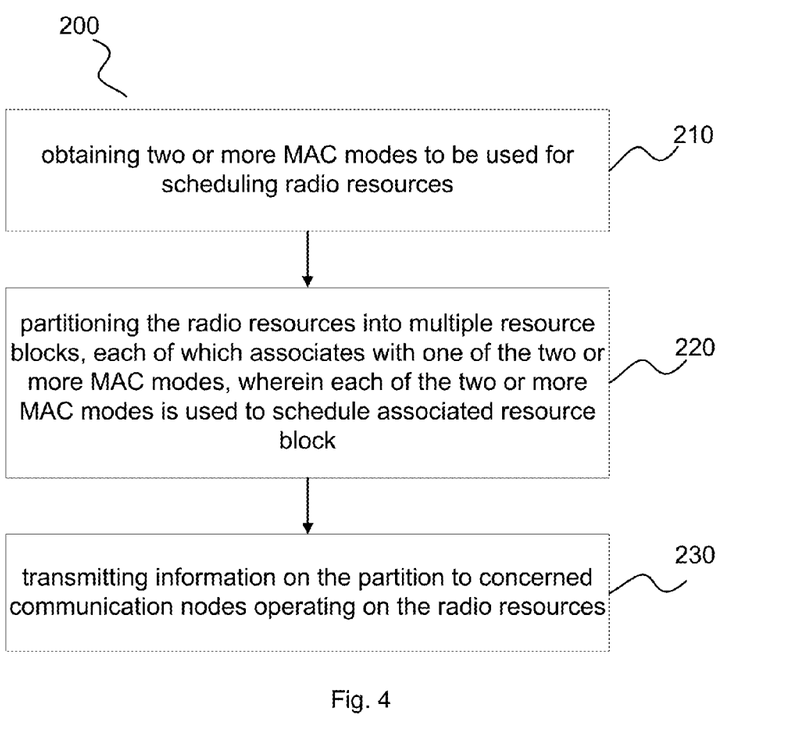
FIG. 4 schematically illustrates a flowchart of a method implemented by a communication node for scheduling radio resources in accordance with another embodiment.

In the case that the communication node performing the method above is a coordinating point, it performs the radio resource partition for a plurality of nodes, for example the AP 121 and the UEs 122-123 in the cluster 120. As such, after performing the partition, the coordinating point transmits information on the partition to concerned communication nodes operating on the radio resources, at block 230 as shown in FIG. 4.

Figure 5:
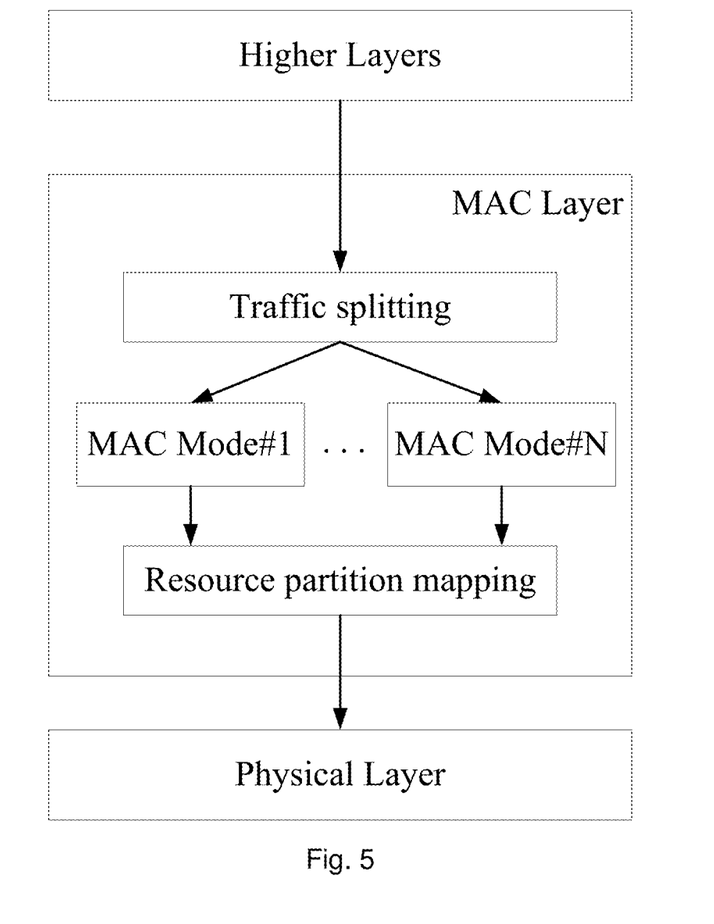
FIG. 5 schematically illustrates a protocol chain for traffic with multiple MAC modes.

After the MAC modes are obtained and the radio resources are partitioned for the obtained MAC mode as described above, the communication node utilizing the MAC modes are enabled to select a suitable MAC mode from the MAC modes to schedule resource for its traffic. FIG. 5 schematically illustrates a protocol chain for traffic with multiple MAC modes. As shown, a plurality of MAC modes, MAC mode#1 to MAC mode#N, is to schedule different parts of its radio resources. After receiving a variety of traffic in MAC layer (Layer 2) from higher layers, the variety of traffic will be split to individual MAC modes selected for them. Once the selected MAC mode for the traffic is determined, the selected MAC mode will schedule associated resource block to transmit the traffic in physical layer (Layer 1). Now the process of selecting a suitable MAC mode for the traffic will be described with reference FIG. 6.

Figure 6:
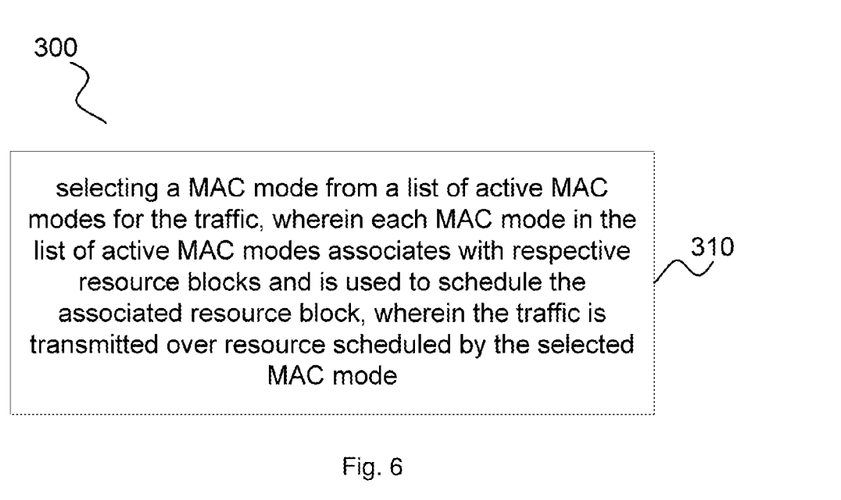
FIG. 6 schematically illustrates a flowchart of a method implemented by a communication node for transmitting traffic in accordance with an embodiment.

In block 310, the communication node selects a MAC mode from a list of active MAC modes for the traffic. Each MAC mode in the list of active MAC modes associates with respective resource blocks and is used to schedule the associated resource block. The traffic will be transmitted over resource scheduled by the selected MAC mode. Here, an active MAC mode refers to the MAC mode that is assigned radio resources. In other words, there are radio resources to be scheduled by the active MAC mode. Accordingly, an inactive MAC mode is not assigned radio resources, thus there is no radio resources that can be scheduled by the MAC mode. Herein, the MAC mode selection can be implemented by the AP or UE receiving/transmitting the traffic. Alternatively, the MAC mode selection can be implemented by an independent node dedicatedly performing the method. The MAC mode can be selected for a link, a communication node, a cluster of nodes or a network. In other words, the selected MAC mode will be used to schedule resource for traffic transmissions of a link, a node, a cluster of nodes or a network.

Specifically, the suitable MAC mode can be selected based on a variety of criteria as desired. For example, the selection of the MAC mode can be based on at least one of information on the traffic, information on the active MAC modes, information on node communicating the traffic, information on network environment where the node communicating the traffic is located.

The information on the traffic includes traffic type, QoS requirements, etc. For example, a burst like traffic may prefers a content-based MAC mode while a more predictable one can add more weight to select the scheduling based MAC mode. In addition, the real-time communications such as voice or video traffic are usually best transferred using scheduling based MAC mode, while sporadic traffic are best using contention based MAC mode or random access MAC mode. For another example, if the traffics require a very high availability of the resource (e.g. C-MTC) or need to transfer small packets very frequently (e.g. voice streaming), then it should favor any MAC mode assigned with a dedicated frequency subpart of the spectrum.

The information on the active MAC modes can be, for example, load of the MAC mode. MAC mode performance is related to the load status of the MAC mode. Information on the load status can be reported as the buffer size, the number of active links or system performance concerning this MAC mode such as latency, throughput, etc. The load status can give hints on whether a given traffic is more suitable for the MAC mode. For example, a contention based MAC mode allows larger delay ranges to access the medium when the load of the MAC mode is high. As such, the delay sensitive traffic should avoid selecting the contention based MAC mode.

The information on the node communicating the traffic includes the node location, topology of links, node capability, etc. Here, the node communicating the traffic may refer to either the node transmitting the traffic or the node receiving the traffic. For example, if the node is located near several other nodes or is subject to interferences, then the MAC modes that are robust or avoiding interferences will be preferred, e.g. contention based MAC mode or scheduling based MAC mode with coordination. Moreover, the node capability means its capability to use the various available MAC modes. Due to hardware/software limitation, the communication node transmitting/receiving the traffic may not support all of the available MAC modes. Hence, only the MAC modes that are supported by both the node transmitting the traffic and the node receiving the traffic can be selected for the traffic.

The information on network environment where the node communicating the traffic is located includes backhauling/coordination capability in the network, the carrier type used, etc. Inter-cell or inter-link interference management is a critical component of various MAC modes. Depending on the possible coordination between active links, and so usually depending on the backhauling capabilities, a certain MAC mode can perform better than others. For example, in a fully distributed system without backhauling or very slow between nodes, distributed MAC modes such as contention based MAC mode is preferable, while well-planned cell communications with good backhauling will prefer the scheduling based MAC mode. Furthermore, the usage of carriers can be taken into account to select the suitable MAC mode. Typically, shared carriers are favoring the contention based MAC mode.

In the embodiment, the MAC mode suitable for the traffic can be selected in advance. Alternatively, the MAC mode suitable for the traffic can be selected in real time, for example upon receiving the traffic in MAC layer of the communication node communicating the traffic.

Figure 7:
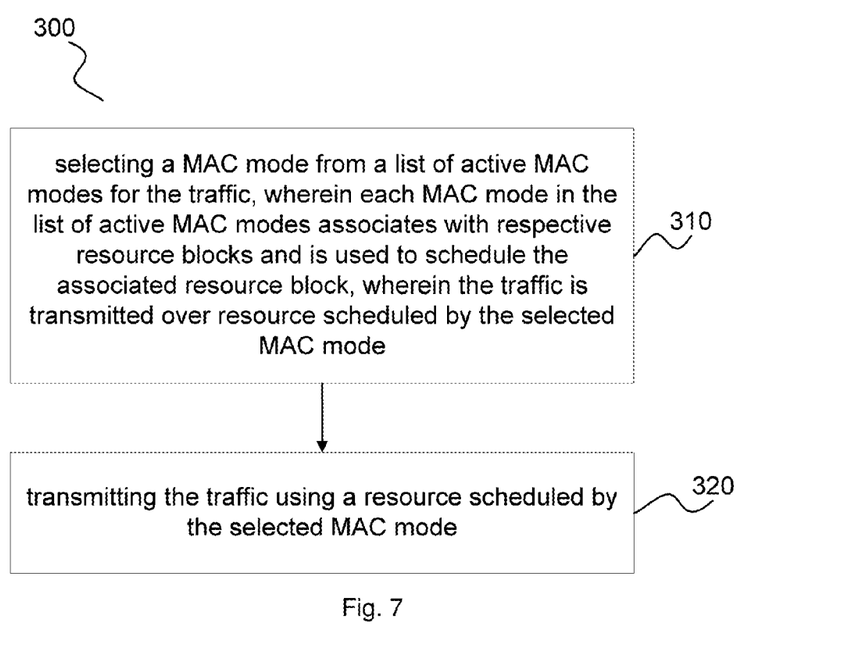
FIG. 7 schematically illustrates a flowchart of a method implemented by a communication node for transmitting traffic in accordance with another embodiment.

As discussed above, the MAC mode selection can be performed in centralized or distributed manner. In the centralized manner, a coordinating point will be used to select MAC mode for the traffic in a link, a node, a cluster of nodes or a network. Once the MAC mode is selected, the coordinating point will inform the concerned node(s) of the selected MAC mode, for example, via message information. In the distributed manner, each communication node selects the MAC mode for its traffic by itself. In this case, the communication node can perform the MAC mode selection after receiving the traffic in its MAC layer. Once the suitable MAC mode is selected for the traffic by the way described above, the communication node can use the selected MAC mode to schedule resource, and then transmit the traffic using the scheduled resource in block 320, as illustrated in FIG. 7.

Furthermore, the MAC mode can be selected based on various kinds of information as described above. The information needs to be exchanged among the communication nodes. For example, in the centralized manner, the communication nodes need to transmit the information on the traffic and the information on themselves to the coordinating point. In the distributed manner, the communication node transmitting the traffic needs to know the information on the communication node receiving the traffic in selecting the suitable MAC mode for the traffic. The information can be transmitted in various ways, for example through backhauling.

Moreover, it is possible that there is no MAC mode suitable for the traffic within the list of active MAC modes. In this case, an inactive MAC mode that is suitable for the traffic can be activated and added the activated MAC mode to the list of active MAC modes. The activating the inactive MAC mode comprises partitioning a portion of radio resource to associate with the inactive MAC mode. On the other hand, when an active MAC mode doesn't serve any traffic up to a predetermined time interval, it means that this active MAC mode is of no use now. In this case, this active MAC mode will be deactivated and removed the active MAC mode from the list of active MAC modes. In this way, the radio resource assigned to this active MAC mode can be withdrawn and assigned to other active MAC modes for transmitting the traffic.

Figure 8:
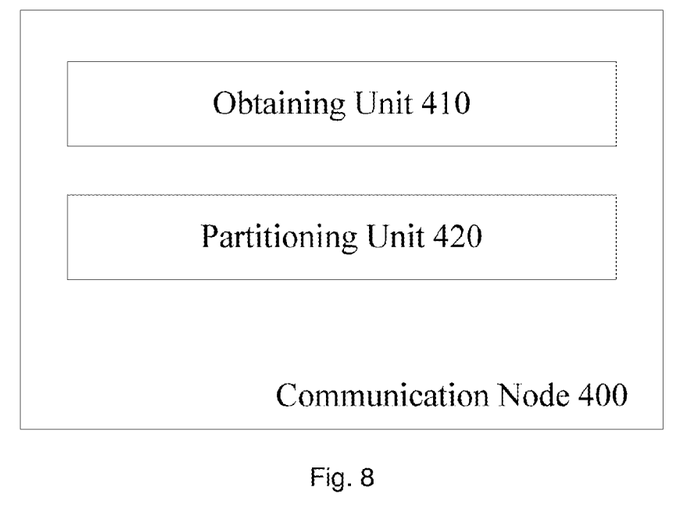
FIG. 8 is a block diagram of a communication node configured to schedule radio resources in accordance with an embodiment.

FIG. 8 is a block diagram of a communication node 400 configured to schedule radio resources in accordance with an embodiment. Here, the communication node 400 can be either an AP or a UE as shown in FIG. 1. In this case, the communication node performs radio resource partition for itself. Alternatively, the communication node can be a coordinating point dedicated to perform radio resource partition for a plurality of APs or UEs. As shown, the communication node 400 comprises an obtaining unit 410 and a partitioning unit 420. Now the function of the individual units will be described in detail with reference to the FIG. 8.

The obtaining unit 410 of the communication node 400 is adapted to obtain two or more MAC modes to be used for scheduling radio resources. If the communication node is an AP or UE, the communication node will obtain several MAC modes available to the AP or UE. If the communication node is a coordinating point that performs radio resource partition for a plurality of APs or UEs, the communication node will communicate with the APs or UEs to obtain the MAC modes available to them.

The partitioning unit 420 of the communication node 400 is adapted to partition the radio resources into multiple resource blocks, each of which associates with one of the two or more MAC modes. Each of the two or more MAC modes is used to schedule associated resource block. Specifically, each of the MAC modes will be designated to handle a different resource block.

In an embodiment, the communication node 400 is a UE. The UE is using a set of radio resources to communicate with other network nodes. On the one hand, the UE is to transmit data stream to an AP over a first subset of the radio resources. On the other hand, the UE is to transmit data stream to another UE over a second subset of the radio resources. As such, the partitioning unit 420 partitions the first subset of radio resources to the scheduling based MAC mode, and the second subset of radio resources to the content based MAC mode.

In another embodiment, the communication node 400 is an AP. The AP serves a plurality of UEs. One of them is known to have critical traffic, since it is a sensor device with alarm. In this case, the AP can split the resources into two parts, one for critical traffic and the other for regular traffic. Both can use a scheduling based MAC scheme but with different parameters such as timing, prioritization, resource location, etc.

In another embodiment, the communication node 400 is a cluster coordinating point that performs radio resource partition for the communication nodes in the cluster 120 in FIG. 1. As illustrated in FIG. 1, the cluster 120 is adjacent to the clusters 110 and 130 and located between them. The clusters 110 and 130 are using their own MAC mode independently to each other. The cluster 110 is using the MAC mode#1 and the cluster 130 is using the MAC mode#2. As such, the cluster 120 will be interfered by both the cluster 110 and the cluster 130. Hence, the partitioning unit 420 can make a partition to let nodes within cluster 120 use the same MAC mode as their neighbor cluster. For example, The UE 122 close to the cluster 110 will use the MAC mode#1, and the UE 123 close to the cluster 130 will use the MAC mode#2. Accordingly, the radio resource used by UE 122 will be partitioned to associate with the MAC mode#1, and the radio resource used by the UE 123 will be partitioned to associate with the MAC mode#2.

As can be seen, the partition can be performed in either centralized or distributed way. In the centralized way, the communication node is a coordinating point. In the distributed way, the communication node is a UE or an AP.

Figure 9:
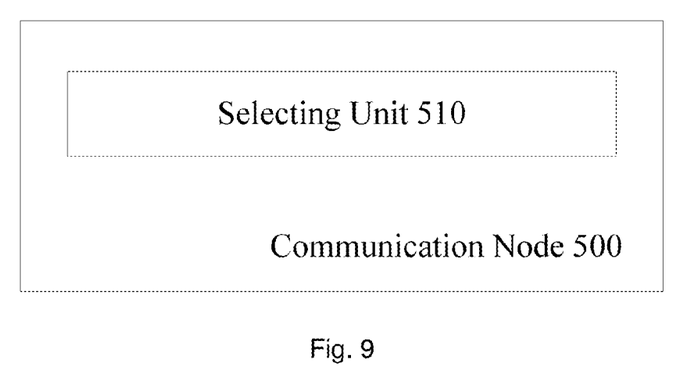
FIG. 9 is a block diagram of a communication node configured to transmit traffic in accordance with an embodiment.

After the MAC modes are obtained and the radio resources are partitioned for the obtained MAC mode as described above, the communication node utilizing the MAC modes are enabled to select a suitable MAC mode from the MAC modes to schedule resource for its traffic. FIG. 9 illustrates a block diagram of a communication node 500 configured to select a suitable MAC mode for the traffic. In one embodiment, the communication node 500 can be integrated with the communication node 400. In another embodiment, the communication node 500 can be an independent entity.

The selecting unit 510 of the communication node 500 is adapted to select a MAC mode from a list of active MAC modes for the traffic. Each MAC mode in the list of active MAC modes associates with respective resource blocks and is used to schedule the associated resource block. The traffic will be transmitted over resource scheduled by the selected MAC mode. Here, an active MAC mode refers to the MAC mode that is assigned radio resources. In other words, there are radio resources to be scheduled by the active MAC mode. Accordingly, an inactive MAC mode is not assigned radio resources, thus there is no radio resources that can be scheduled by the MAC mode. The MAC mode can be selected for a link, a communication node, a cluster of nodes or a network. In other words, the selected MAC mode will be used to schedule resource for traffic transmissions of a link, a node, a cluster of nodes or a network.

Specifically, the selecting unit 510 can select the suitable MAC mode based on a variety of criteria as desired. For example, the selection of the MAC mode can be based on at least one of information on the traffic, information on the active MAC modes, information on node communicating the traffic, information on network environment where the node communicating the traffic is located.

The information on the node communicating the traffic includes the node location, topology of links, node capability, etc. Here, the node communicating the traffic may refer to either the node transmitting the traffic or the node receiving the traffic. For example, if the node is located near several other nodes or is subject to interferences, then the MAC modes that are robust or avoiding interferences will be preferred. Moreover, the node capability means its capability to use the various available MAC modes. Due to hardware/software limitation, the communication node transmitting/receiving the traffic may not support all of the available MAC modes. Hence, only the MAC modes that are supported by both the node transmitting the traffic and the node receiving the traffic can be selected for the traffic.

Moreover, it is possible that there is no MAC mode suitable for the traffic within the list of active MAC modes. In this case, the communication node 500 can activate an inactive MAC mode that is suitable for the traffic can and add the activated MAC mode to the list of active MAC modes. The activating the inactive MAC mode comprises partitioning a portion of radio resource to associate with the inactive MAC mode. On the other hand, when an active MAC mode doesn't serve any traffic up to a predetermined time interval, it means that this active MAC mode is of no use now. In this case, the communication node 500 will deactivate the active MAC mode and remove the active MAC mode from the list of active MAC modes. In this way, the radio resource assigned to this active MAC mode can be withdrawn and assigned to other active MAC modes for transmitting the traffic.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method implemented by a communication node for transmitting traffic in a radio communication network, comprising:
   selecting a media access control (MAC) mode from a list of active MAC modes for the traffic, wherein each MAC mode in the list of active MAC modes associates with respective resource blocks and is used to schedule an associated resource block, and wherein if there is no MAC mode suitable for the traffic within the list of active MAC modes, activating an inactive MAC mode that is suitable for the traffic and adding the activated MAC mode to the list of active MAC modes; and
   transmitting the traffic using the associated resource block scheduled by the selected MAC mode.

2. The method of claim 1, wherein the selecting the MAC mode comprises selecting the MAC mode for the traffic based on at least one of information on the traffic, information on the active MAC modes, information on node communicating the traffic, and information on a network environment where the node communicating the traffic is located.

3. The method of claim 2, wherein the information based on which the MAC mode is selected is obtained through backhauling.

4. The method of claim 1, wherein the selected MAC mode is used to schedule resource for traffic transmissions of a link, a node, a cluster of nodes, or a network.

5. The method of claim 1, the selecting the MAC mode comprises selecting the MAC mode for the traffic after receiving the traffic.

6. The method of claim 1, wherein when an active MAC mode doesn't serve any traffic up to a predetermined time interval, deactivating the active MAC mode and removing the active MAC mode from the list of active MAC modes.

7. A communication node configured to transmit traffic in a radio communication network, comprising:
   a processor and a non-transitory computer-readable storage medium couple to the processor, the non-transitory computer-readable storage medium storing instructions which, when run on the communication node, causing the communication node to:
   select a media access control (MAC) mode from a list of active MAC modes for the traffic, wherein each MAC mode in the list of active MAC modes associates with respective resource blocks and is used to schedule an associated resource block, wherein if there is no MAC mode suitable for the traffic within the list of active MAC modes, activating an inactive MAC mode that is suitable for the traffic and adding the activated MAC mode to the list of active MAC modes, and
   transmit the traffic using the associated resource block scheduled by the selected MAC mode.

8. The communication node of claim 7, wherein the selection is further to select the MAC mode for the traffic based on at least one of information on the traffic, information on the active MAC modes, information on node communicating the traffic, and information on a network environment where the node communicating the traffic is located.

9. The communication node of claim 8, wherein the information based on which the MAC mode is selected is obtained through backhauling.

10. The communication node of claim 7, wherein the selected MAC mode is used to schedule resource for traffic transmissions of a link, a node, a cluster of nodes, or a network.

11. The communication node of claim 7, the selection is further to select the MAC mode for the traffic after receiving the traffic.

12. The communication node of claim 7, wherein when an active MAC mode doesn't serve any traffic up to a predetermined time interval, the communication node is adapted to deactivate the active MAC mode and remove the active MAC mode from the list of active MAC modes.

* * * * *

UNITED STATES PATENT AND TRADEMARK OFFICE
CERTIFICATE OF CORRECTION

PATENT NO. : 9,967,896 B2
APPLICATION NO. : 14/765819
DATED : May 8, 2018
INVENTOR(S) : Garcia et al.

Page 1 of 1

It is certified that error appears in the above-identified patent and that said Letters Patent is hereby corrected as shown below:

On the Title Page

In Column 1, under "Notice", Line 3, delete "0 days. days." and insert -- 0 days. --, therefor.

Signed and Sealed this
Fourth Day of December, 2018

Andrei Iancu
*Director of the United States Patent and Trademark Office*